US011945013B2

(12) United States Patent
Smith

(10) Patent No.: US 11,945,013 B2
(45) **Date of Patent: *Apr. 2, 2024**

(54) BOTTLE CAP THREAD RINSING SYSTEM

(71) Applicant: Nolan Smith, Philipsburg, MT (US)

(72) Inventor: Nolan Smith, Philipsburg, MT (US)

(73) Assignee: Philipsburg Brewing Company, LLC, Philipsburg, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,399

(22) Filed: Jun. 13, 2022

(65) Prior Publication Data

US 2022/0305535 A1 Sep. 29, 2022

Related U.S. Application Data

(60) Division of application No. 16/542,101, filed on Aug. 15, 2019, now Pat. No. 11,358,188, which is a continuation of application No. 15/824,954, filed on Nov. 28, 2017, now Pat. No. 10,464,109.

(60) Provisional application No. 62/428,452, filed on Nov. 30, 2016.

(51) Int. Cl.
*B08B 9/34* (2006.01)
*B08B 3/02* (2006.01)
*B65D 51/24* (2006.01)

(52) U.S. Cl.
CPC .................. *B08B 9/34* (2013.01); *B08B 3/02* (2013.01); *B65D 51/24* (2013.01)

(58) Field of Classification Search
CPC .. B08B 9/34; B08B 3/02; B65D 51/24; B67B 3/00; B67C 7/00
See application file for complete search history.

(56) References Cited

U.S. PATENT DOCUMENTS 2,055,704 A 9/1936 Pierce
4,349,055 A 9/1982 DiChiara
4,389,833 A 6/1983 Knabe
4,564,132 A 1/1986 Lloyd-Davies
(Continued)

FOREIGN PATENT DOCUMENTS

CN 205797944 12/2016
JP 2003260429 9/2003

OTHER PUBLICATIONS

Office Action for U.S. Appl. No. 16/542,101, dated Jul. 22, 2021, Smith, "Bottle Cap Thread Rinsing System", 11 Pages.
(Continued)

*Primary Examiner* — Duy Vu N Deo
*Assistant Examiner* — Christopher Remavege
(74) *Attorney, Agent, or Firm* — Lee & Hayes P.C.

(57) ABSTRACT

Systems and methods for rinsing beverage residue from a mechanical interface between threads of a bottle and threads of a bottle cap is described. The bottle cap may include a sealable coating to create a seal against a rim of the bottle. The bottle cap may also include passages to allow pressurized water to be injected into an upper inner region of the bottle cap. The pressurized water is prevented from entering the bottle due to the seal between the rim of the bottle and the sealable coating of the bottle cap. Therefore, the pressurized water is caused to escape through the mechanical thread interface toward a lower inner region of the bottle cap where the water escapes from the cap at atmospheric pressure.

20 Claims, 12 Drawing Sheets

(56) References Cited

U.S. PATENT DOCUMENTS

| | | | | |
|---|---|---|---|---|
| 4,718,465 | A | 1/1988 | Dugan | |
| 4,722,333 | A | 2/1988 | Bartos | |
| 4,944,810 | A | 7/1990 | McBrady | |
| 5,040,354 | A | 8/1991 | Ahlers et al. | |
| 5,150,558 | A | 9/1992 | Bernhard | |
| 5,235,793 | A | 8/1993 | Heudecker | |
| 5,402,621 | A | 4/1995 | Weiss | |
| 6,484,477 | B1 | 11/2002 | Bernhard | |
| 6,491,047 | B2 | 12/2002 | Abe | |
| 6,585,829 | B1 | 7/2003 | Suzuki et al. | |
| 6,945,011 | B2 | 9/2005 | Hidding et al. | |
| 8,834,640 | B2 | 9/2014 | Kappel et al. | |
| 9,233,820 | B2 | 1/2016 | Bernhard | |
| 9,505,599 | B2 | 11/2016 | Marantis et al. | |
| 11,358,188 | B2 * | 6/2022 | Smith | B65D 51/24 |
| 2006/0172085 | A1 | 8/2006 | Kobayashi et al. | |
| 2010/0154364 | A1 | 6/2010 | Bernhard | |
| 2010/0275955 | A1 | 11/2010 | Ueda et al. | |
| 2012/0247513 | A1 | 10/2012 | Johnson | |
| 2012/0311966 | A1 | 12/2012 | Melrose | |
| 2013/0239522 | A1 | 9/2013 | Melrose | |
| 2013/0341905 | A1 | 12/2013 | Lehmann et al. | |
| 2014/0259373 | A1 | 9/2014 | Peet | |
| 2016/0137474 | A1 | 5/2016 | Marantis et al. | |
| 2016/0175201 | A1 | 6/2016 | Schuessler | |
| 2017/0341104 | A1 | 11/2017 | Johnston et al. | |
| 2018/0147613 | A1 | 5/2018 | Smith | |
| 2019/0062033 | A1 | 2/2019 | Fleischman et al. | |
| 2019/0366398 | A1 | 12/2019 | Smith | |

OTHER PUBLICATIONS

Translation of JP-3718604-B2, Hatta.

Wei, (CN 205797944 U ) Machine Translation provided by EPO, generated Jul. 17, 2021, 2021, 6 pgs.

* cited by examiner

BOTTLE CAP THREAD RINSING SYSTEM

CROSS REFERENCE TO RELATED APPLICATION

This application is a continuation of and claims priority to U.S. patent application Ser. No. 16/542,101, titled "Bottle Cap Thread Rinsing System," filed on Aug. 15, 2019, which is a continuation of and claims priority to U.S. patent application Ser. No. 15/824,954, titled "Bottle Cap Thread Rinsing System," filed on Nov. 28, 2017, which claims priority to U.S. Provisional Patent Application Ser. No. 62/428,452, filed on Nov. 30, 2016, the entire contents of both are incorporated herein by reference.

BACKGROUND

It is well known that sanitary conditions are desirable when making and/or packaging beer as bacteria may thrive and grow in, and ultimately spoil, the beverage. Accordingly, many precautions are commonly taken to avoid bacteria and other contaminants from entering the beverage. One such pre-caution is the practice of "capping on foam" in which a container is filled with beer that is caused to foam out of the container during the capping process. For example, pre-carbonated beer may be injected into a bottle under conditions which cause the beer to off-gas carbon dioxide thereby generating a frothy head of foam which overflows out of the bottle. The foam may be desirable during capping as it may prevent contaminants and oxygen from reaching the interior of the bottle prior to a cap being placed onto and sealing the bottle. A cap may therefore be placed over the foam and onto the bottle and secured to the bottle, e.g., via a pilfer ring secured to a lip of the bottle.

Capping a threaded bottle on beer foam, however, may result in beer residue being trapped under the cap around the bottle threads. Over time this beer residue may become sticky or even contaminated with mold or bacteria. Traditionally, solutions to this problem involve spraying the exterior of the bottle cap with sprayers located above the bottle, similar to cleaning a car in a car wash. However, these sprayers are often inaccurate and the cleaning fluid insufficiently covers the areas that require cleaning. Furthermore, this method requires excessive amounts of water to reach the threaded area of a bottle. That is, prior techniques are imprecise and wasteful.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
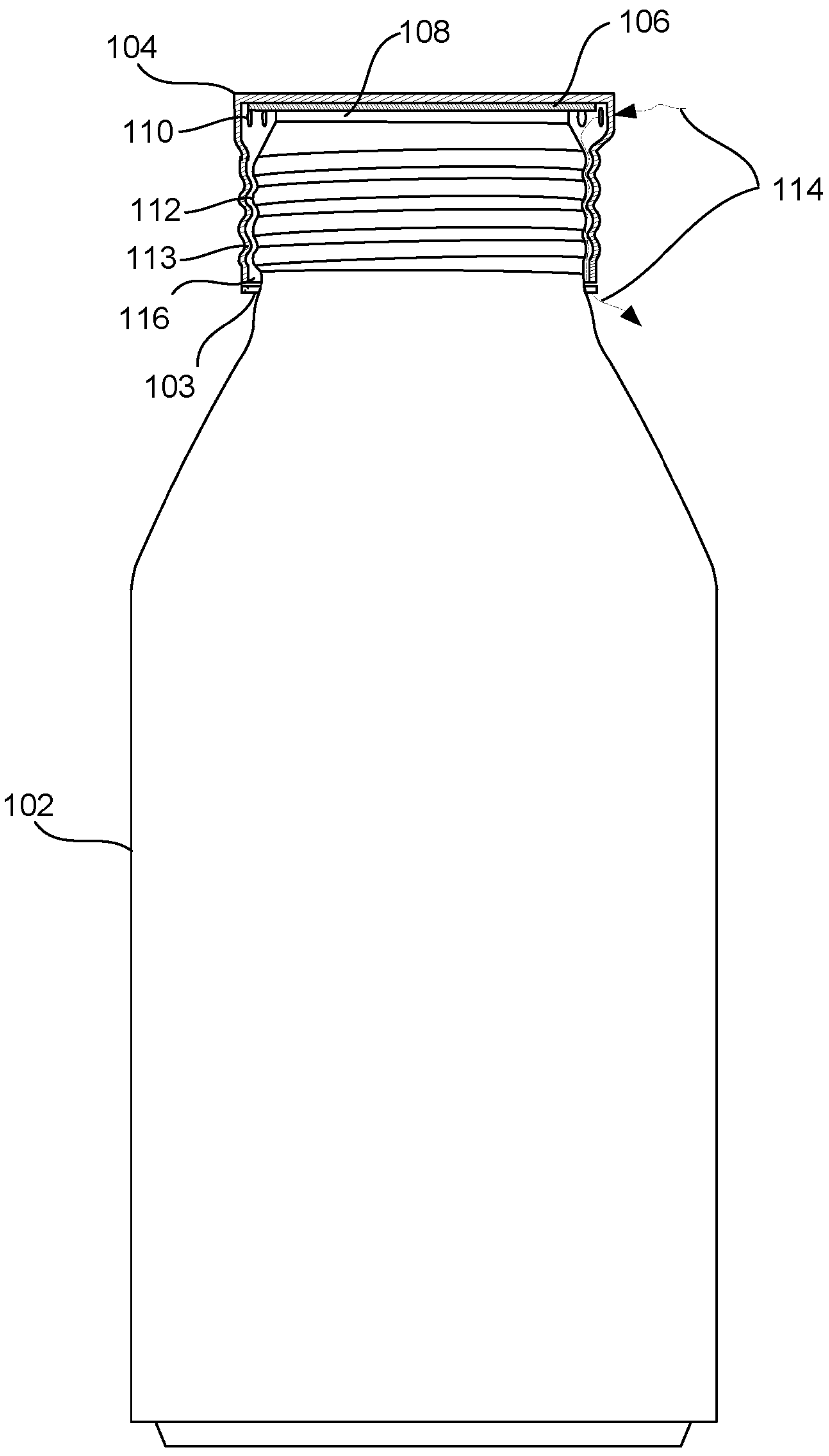
FIG. 1 illustrates a threaded beverage bottle that is sealed by a cap that includes a sealable coating that mates with a rim of the bottle, the cap illustrated with a cross-sectional view.

As discussed above, beverage residue that is trapped between threads of a bottle and a bottle cap may become sticky or may become contaminated with bacteria or mold. This disclosure describes a system and method that efficiently causes fluid to rinse beverage residue from the area between threads of a bottle and a bottle cap. In an embodiment, a manifold comprises a plurality of bottle adapters that are configured to form a seal with a plurality of bottles. When the manifold is lowered onto the plurality of bottles, the manifold centers individual ones of the plurality of bottles directly below a respective bottle adapter such that the bottle adapter can properly engage with the bottle. Once engaged, the system may force fluid into the manifold and into individual ones of the plurality of bottle adapters. The fluid then travels into passages of the bottle caps effectively cleaning the threads of the bottle. For example, referring to FIG. 1, a threaded beverage bottle 102 may be sealed with a bottle cap 104 that is threaded onto the bottle 102. The bottle cap 104 is shown as a cross-section view in order to illustrate the manner in which the bottle cap 104 seals against a rim 108 of the bottle 102. In particular, the bottle cap 104 may include a sealable coating 106 which creates a seal against the rim 108 of the bottle 102. The bottle cap 104 may be secured to bottle 102 via a pilfer ring 103, or any other attaching mechanism that enables a fluid to exit the bottle cap 104. The bottle cap 104 may also include a plurality of passages 110 to allow fluid (e.g., water and/or air) to pass from outside the bottle cap 104 to inside the bottle cap 104. In some implementations, the sealable coating 106 of the bottle cap 104 is pressed against the rim 108 while the bottle cap 104 is mechanically deformed to mate with threads 112 of the bottle 102, forming cap threads 113. For example, the bottle cap 104 may be placed onto the bottle 102 and secured to keep the sealable coating 106 pressed against the rim 108 to seal off the interior of the bottle 102, e.g., to seal beer into the bottle 102.

The bottle 102 and the bottle cap 104 may be constructed of any material that is suitable for containing a beverage or fluid. Suitable material types include but are not limited to aluminum, plastics, and/or glass.

The sealable coating 106 may be constructed of any material that is suitable for creating an airtight seal against the rim 108 of the botte 102. Suitable material types include but are not limited to epoxy-based resins, non-toxic food grade rubbers, and/or silicone materials. In a preferred embodiment, an epoxy-based resin may be utilized because epoxy-based resins are known to absorb oxygen, further preserving the stored beverage. Furthermore, although the bottle cap 104 may be deformed to mate with the bottle threads 112, the mechanical contact between the bottle threads 112 and the bottle cap threads 113 in some instances may allow air and/or liquid to pass through. For example, referring to the path 114, pressurized water may be injected into the bottle cap 104 through the passages 110 but may be prevented from entering the bottle 102 due to the airtight seal between the sealable coating 106 and the rim 108. Accordingly, the pressurized water may escape from the bottle cap 104 by passing over the bottle threads 112 before escaping out the bottom 116 of the bottle cap 104. The pressurized water may escape via a gap in between the pilfer ring 103 and the bottle cap 104 and/or it may also escape beneath the pilfer ring 103. It should be appreciated that the illustrated gap between the bottle cap threads 113 of the bottle cap 104 and the bottle threads 112 is exaggerated to assist in explaining that fluid may pass into the bottle cap 104 through the passages 110 and out of the bottle cap 104 from the bottom 116. Specifically, the gap illustrated between the bottle cap threads 113 and the bottle threads 112 may not actually exist but rather the bottle cap 104 may be in mechanical contact with the bottle threads 112 albeit without forming an air and/or water tight seal.

Figure 2A:
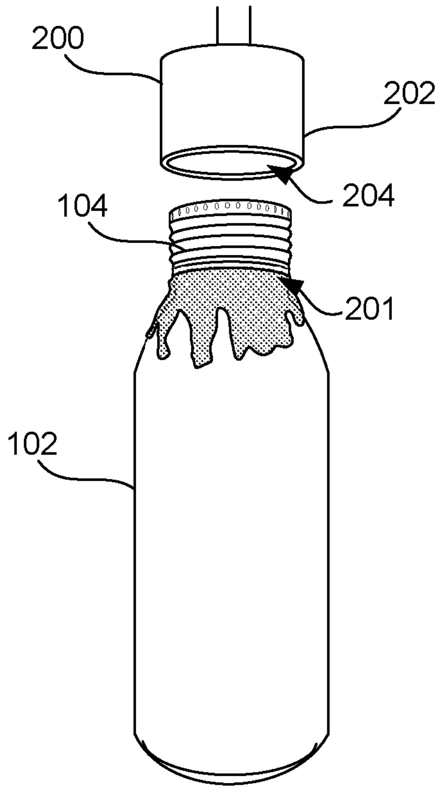
FIGS. 2A-2B illustrate an apparatus for rinsing beer residue that is located between threads on a beverage bottle and a bottle cap that has been secured onto the beverage bottle, in accordance with some embodiments, FIGS. 2A-2B showing the apparatus before engagement with the bottle cap.
Figure 2B:
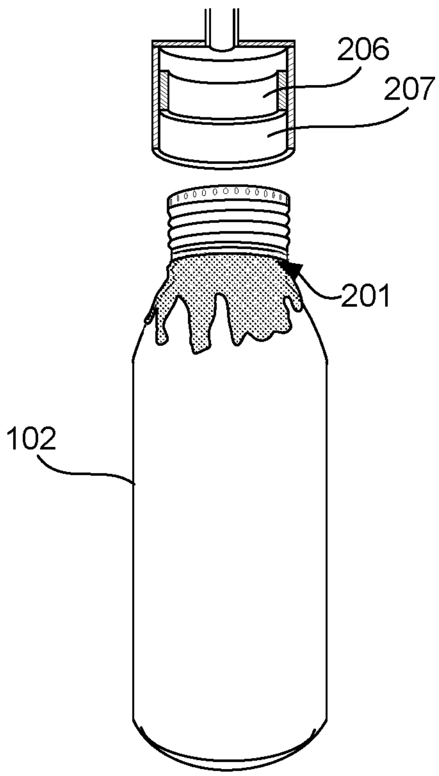
Figure 3A:
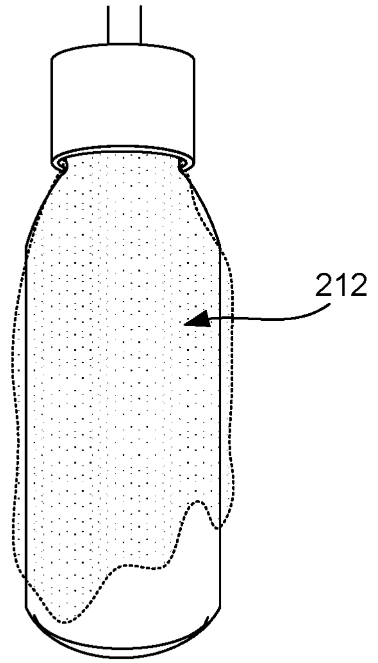
FIGS. 3A-3B illustrate the apparatus of FIGS. 2A-2B engaged onto the bottle cap, FIG. 3B illustrated to show an interior of the apparatus.
Figure 3B:
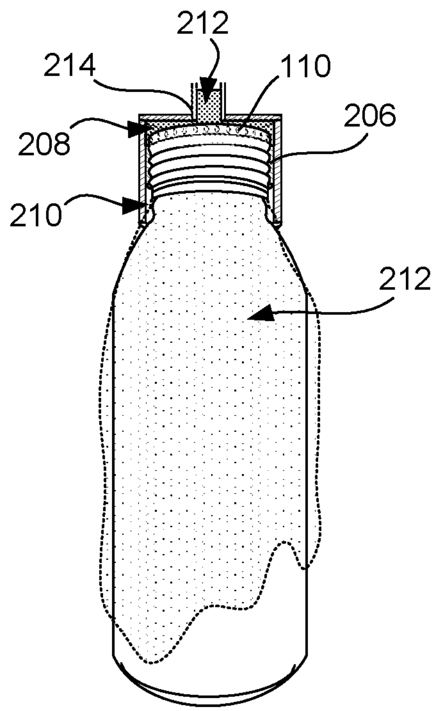

FIGS. 2A-2B illustrate an apparatus 200 for rinsing out beer residue 201 that is located between threads on a beverage bottle 102 and a bottle cap 104 that has been secured onto the beverage bottle 102. FIG. 2A illustrates the apparatus 200 positioned above the bottle 102, e.g., prior to being engaged onto the bottle 102 to enable the threads to be rinsed. The apparatus 200 may include a receiving tube 202 having a lower opening 204 that is sized to enable the bottle cap 104 to be inserted into the receiving tube 202. FIG. 2B illustrates a cross-section view of the apparatus 200 to show an alignment ring 207 that is configured to properly align the bottle cap 104 within the lower opening 204. Additionally, FIG. 2B illustrates a sealing ring 206 that is configured to mate with the bottle cap 104 when the apparatus 200 engages the bottle cap 104. In particular, FIGS. 3A-3B illustrate the apparatus 200 engaged onto the bottle cap 104 for rinsing out the beer residue 201 that is located between threads on a beverage bottle and a bottle cap that has been secured onto the beverage bottle 102. For example, with specific reference to FIG. 3B, the sealing ring 206 is shown as conforming to the shape of the bottle cap 104 to at least partially generate a seal between the apparatus 200 and the bottle cap 104. Therefore, once the apparatus 200 is engaged onto the bottle cap 104 to cause the sealing ring 206 to seal an upper interior region 208 of the bottle cap 104 off from a lower interior region 210 of the bottle cap 104, pressurized water 212 (i.e., water at a pressure that is higher than atmospheric pressure) may be forced into the upper interior region 208 of the apparatus 200 through a water inlet 214 that is connected to a water source. The pressurized water 212 is then forced into the upper interior region 208 through the passages 110 of the bottle cap 104 and is expelled from the lower interior region 210 at atmospheric pressure. The pressurized water 212 may be expelled by allowing the pressurized water 212 to drain and dry and/or by forcing air through the upper interior region 208 and through passages 110. Beer residue 201 is washed out as the pressurized water 212 passes between the bottle threads 112 (not illustrated in FIGS. 2A-2B or 3A-3B) and the bottle cap 104. Therefore, undesirable outcomes such as stickiness and/or mold incubation that could have otherwise resulted from the beer residue may be prevented. Additionally, the partial seal generated between the apparatus 200 and the bottle cap 104 may assure that the water used for washing is used efficiently. That is, nearly all of the water expelled from water inlet 214 is forcibly and intentionally run over the bottle threads 112, minimizing waste. Furthermore, the seal created between the sealable coating 106 and the rim 108 prevents the pressurized water 212 from entering the bottle 102. In some implementations, the pressurized water 212 may include a sanitizing agent such as, for example, an oxygen based no rinse cleanser to sanitize the bottle 102 and bottle cap 104 prior to final packaging for the end consumer. Further, in some implementations, pressurized air (i.e., air at a pressure that is higher than atmospheric pressure) may be forced into the upper interior region 208 subsequent to the pressurized water 212 to dry the bottle after rinsing.

Figure 4:
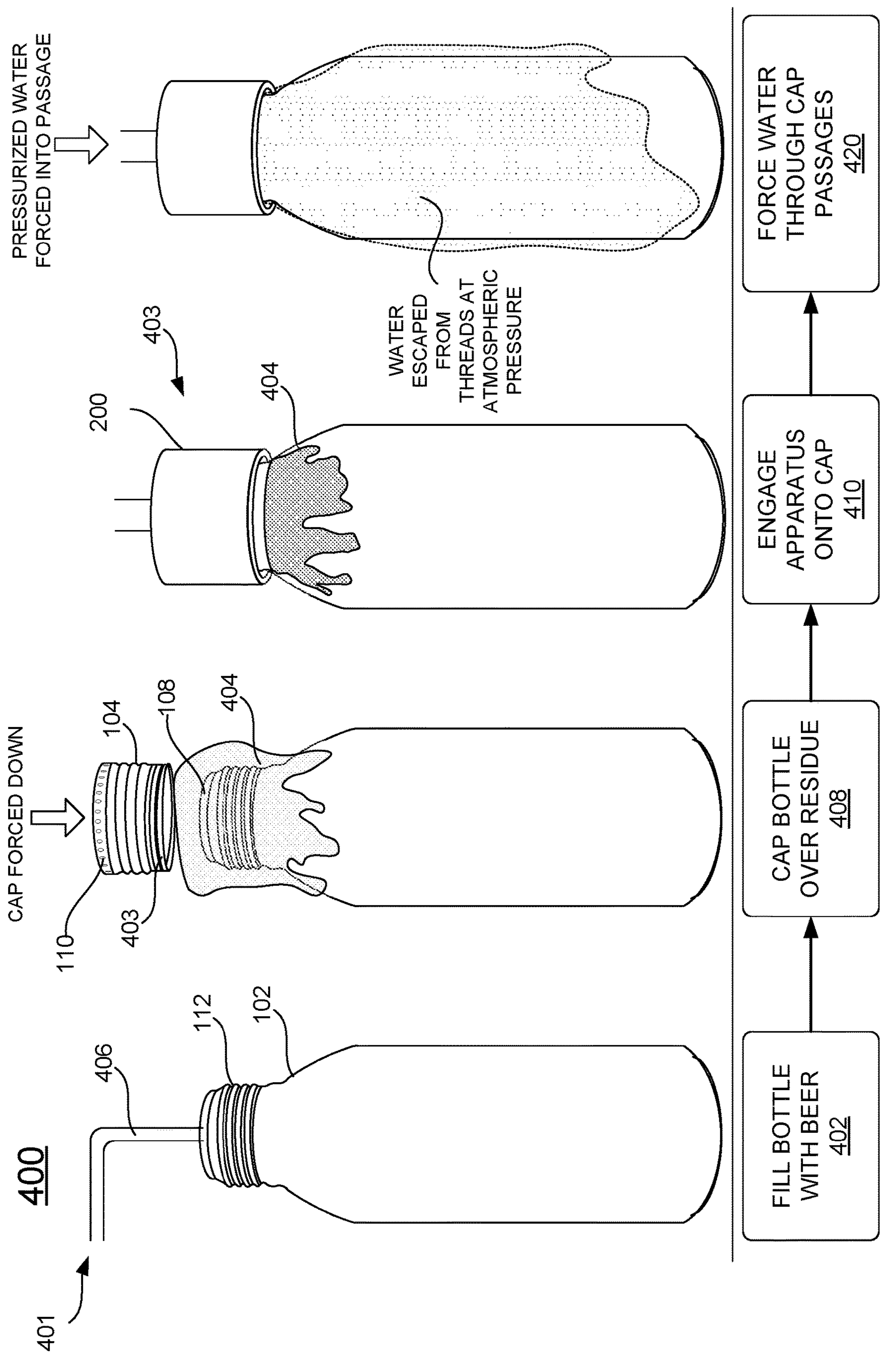
FIG. 4 is a pictorial flow diagram that shows an illustrative process of and apparatus for capping a filled beverage bottle and rinsing beverage residue out of the inner portion of the threads.

FIG. 4 is a pictorial flow diagram that shows an illustrative process of a bottling system 400 that fills and caps bottle 102 via a beverage dispensing system 401, and rinses beverage residue 404 out of the inner portion of the threads, e.g., the boundary between the bottle threads 112 and the bottle cap threads 113 via a bottle rinsing system 403.

At block 402, beverage dispensing system 401 may fill a bottle 102 with a beverage such as, for example, beer. In some implementations, the beverage may be precarbonated using various carbonation methods such as force carbonating the beverage with pressurized carbon dioxide. Beverage dispensing system 401 may inject the beverage into the bottle via a filler tube 406. Filling the bottle at block 402 may result at least some of the beverage overflowing from the bottle 102 as the beverage residue 404. For example, beverage dispensing system 401 may intentionally overfill the bottle 102 or cause the bottle 102 to foam over with beverage residue to enable the "capping on foam" of the beverage to prevent contamination. Additionally or alternatively, after the bottle is filled with the beverage, the beverage dispensing system may agitate the beverage in order to cause the beverage to foam. For instance, the beverage may be agitated by quickly spraying the beverage with hot or cold water, adding nitrogen to the beverage, or using ultrasound to vibrate the bottle and beverage.

At block 408, the bottling system 400 may place a bottle cap 104 over the bottle 102 directly over the beverage residue 404 such that the inner portion of the bottle cap 104 becomes at least partially into contact with the beverage residue 404. For example, the bottling system 400 may press bottle cap 104 over the residue 404 and onto the rim 108 of the bottle 102 to create a seal between the rim 108 and the sealable coating 106 (not illustrated in FIG. 4) of the bottle cap 104. The bottling system 400 may secure bottle cap 104 to the bottle via a pilfer ring, such as pilfer ring 103.

At block 410, the bottle rinsing system 403 may engage the apparatus 200 onto the bottle cap 104. As illustrated in FIG. 2B, this may include an alignment ring 207 that is configured to properly align the bottle cap 104 within the lower opening 204 of the apparatus 200 and a sealing ring 206 that is configured to mate with the bottle cap 104 when the apparatus 200 engages the bottle cap 104. Additional and/or alternative examples of aligning the bottle cap 104 within the lower opening 204 are described below.

At block 420, the bottle rinsing system 403 may force pressurized water through the passages 110 of the bottle cap 104 to rinse beverage residue from the bottle threads 112. Additionally or alternatively, the bottle rinsing system may force pressurized sanitary solution and/or pressurized air through the passages 110 of the bottle cap 104 and across the bottle threads 112.

Figure 5:
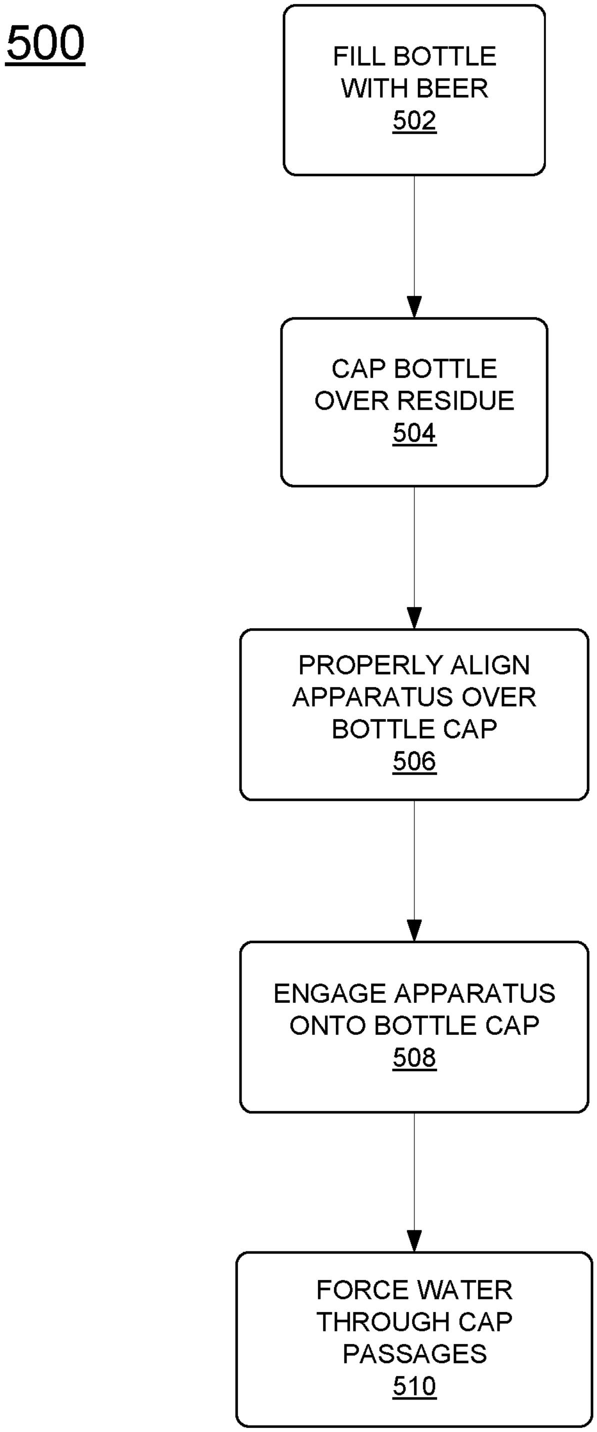
FIG. 5 is a flow diagram that illustrates a process of rinsing beverage residue out of the inner portion of the threads.

FIG. 5 illustrates a flow diagram 500 that illustrates a further embodiment of filling a bottle 102 with a beverage and rinsing beverage residue 404 out of the inner portion of the threads, e.g., the boundary between the bottle threads 112 and the bottle cap threads 113.

At block 502, similar to block 402, a beverage dispensing system 401 fills a bottle 102 with a beverage such as, for example, beer. In some implementations, the beverage may be precarbonated using various carbonation methods such as force carbonating the beverage with pressurized carbon dioxide. The beverage dispensing system 401 may inject the beverage into the bottle via a filler tube 406. Filling the bottle at block 502 may result in at least some of the beverage overflowing from the bottle 102 as beer residue 404. For example, beverage dispensing system 401 may intentionally overfill the bottle 102 or cause the bottle 102 to foam over with beverage residue to enable the "capping on foam" of the beverage to prevent contamination.

At block 504, similar to block 408, the bottling system 400 may place a bottle cap 104 over the bottle 102 directly over the beverage residue 404 such that the inner portion of the bottle cap 104 becomes at least partially into contact with the beverage residue 404. For example, the bottling system 400 may press the bottle cap 104 over the residue 404 and onto the rim 108 of the bottle 102 to create a seal between the rim 108 and the sealable coating 106 of the bottle cap 104. The bottling system 400 may secure the bottle cap 104 to the bottle via a pilfer ring, such as a pilfer ring 103.

At block 506, the bottle rinsing system 403 may properly align the apparatus 200 with the bottle cap 104 such that when the apparatus 200 is fully lowered onto the bottle 102, the sealing ring 206 is located below the passages 110 and the bottle 102 is aligned vertically with the apparatus 200. Additional details associated with aligning the apparatus 200 with the bottle cap 104 are discussed below with reference to FIG. 7. The apparatus 200 may be aligned with the bottle cap 104 manually or automatically (e.g., computer programming, conveyer belts, and/or laser alignment). In some embodiments, the bottle rinsing system 403 may partially lower the apparatus 200 such that the walls of the apparatus 200 may contact an upper portion of the bottle 102, centering the bottle 102 directly under the sealing ring 206.

At block 508, the bottle rinsing system 403 may fully lower the apparatus 200 onto the bottle cap 104 to engage the apparatus 200 onto the bottle cap 104. The apparatus 200 may include an alignment ring 207 that is configured to properly align the bottle cap 104 within the lower opening 204 of the apparatus 200 and a sealing ring 206 that is configured to mate with the bottle cap 104 when the apparatus 200 engages the bottle cap 104.

At block 510, the bottle rinsing system 403 may force pressurized water through the apparatus 200 and through the passages 110 while the sealing ring 206 is conforming to the shape of the bottle cap 104 to at least partially generate a seal between the apparatus 200 and the bottle cap 104. At block 510, the bottle rinsing system 403 may force pressurized water through the passages 110 of the bottle cap 104 to rinse beverage residue from the bottle threads 112. In further embodiments, bottle rinsing system 403 may force other fluids may through the passages 110 of the bottle cap 104 via the apparatus. For example, the bottle rinsing system 403 may force pressurized air through the passages to further remove any residual water from forcing the water through the passages 110 at block 510.

Figure 6:
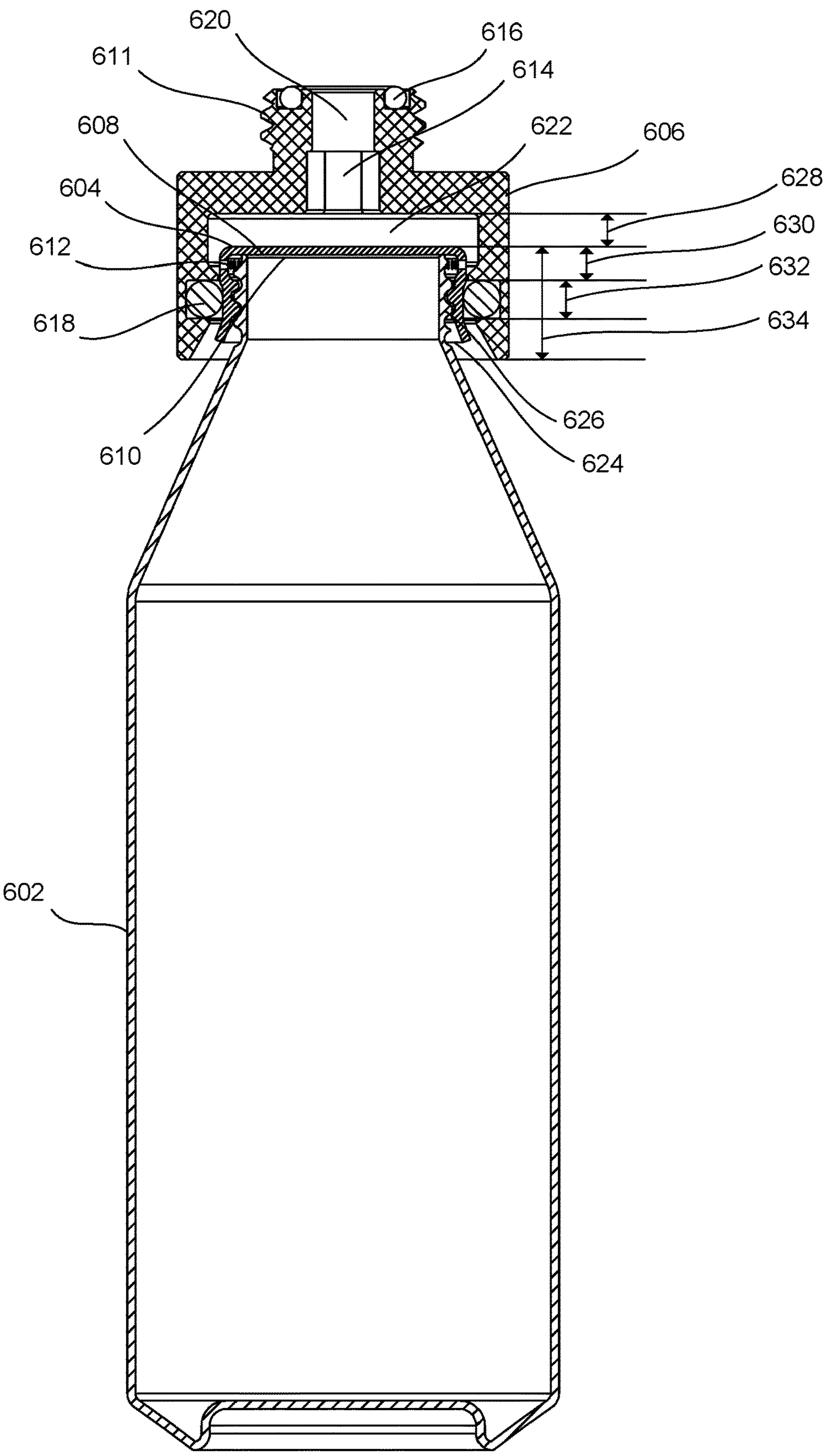
FIG. 6 illustrates a cross-sectional view of an apparatus for rinsing beer residue that is located between threads on a beverage bottle and a bottle cap that has been secured onto the beverage bottle, in accordance with some embodiments.

FIG. 6 illustrates a threaded beverage bottle 602 with a sealed bottle cap 604 engaging with a bottle adapter 606. In at least one example, a bottle 602 may correspond to the bottle 102 and the bottle cap 604 may correspond to the bottle cap 104, as described above. The bottle adapter 606 may be the same as, or similar to, the apparatus 200. The bottle cap 604 is shown as a cross-section view in order to illustrate the manner in which the bottle cap 604 seals against a rim 610 of the bottle 602. In particular, the bottle cap 604 may include a sealable coating 608 which creates a seal against the rim 610 of the bottle 602. Although not shown in FIG. 6, a pilfer ring, or some other securing mechanism, may secure the bottle cap 604 to the bottle 602, similar to the pilfer ring 103. The bottle cap 604 may also include a plurality of passages 612 to allow fluid (e.g., water and/or air) to pass from outside the bottle cap 604 to inside the bottle cap 604. In some implementations, the bottle cap 604 may be placed onto the bottle 602 and secured to keep the sealable coating 608 pressed against the rim 610 to seal off the interior of the bottle 602, e.g., to seal beer into the bottle 602.

The bottle adapter 606 may contain a threaded upper portion 611 for engaging with a manifold (not shown in FIG. 6) as well as an installation mechanism 614 for engaging with an installation tool (not shown in FIG. 6) used to attach the bottle adapter 606 into the manifold. An installation mechanism 614 may by any number of shapes and/or socket types that can be used to turn the bottle adapter 606 so that it may be inserted or removed from the manifold. Additionally, the installation mechanism 614 may comprise a mechanism that enables the bottle adapter 606 to be inserted or removed from the manifold that does not require the bottle adapter 606 to turn. For instance, the installation mechanism 614 may comprise a magnet or an adhesive. Furthermore, the bottle adapter 606 may include a face sealing O-ring 616 for forming a seal with the manifold as well as a cap sealing O-ring 618 for forming a seal with the bottle cap 604. Similar to the process described in FIG. 3B and FIG. 4, a bottle rinsing system, such as bottle rinsing system 403, may force fluid through a fluid inlet 620 into an upper interior region 622 through the passages 612 of the bottle cap 604 and then cause the fluid to be expelled from a lower interior region 624 at atmospheric pressure. The bottle rinsing system may wash beer residue, or any other type of residue, out as the pressurized fluid passes between the bottle threads 626 and the bottle cap 604. Therefore, undesirable outcomes, such as stickiness and/or mold incubation that may result from the beer residue caught between the bottle cap 604 and the bottle threads 626 may be prevented. Additionally, the bottle washing system generates a partial seal between the bottle adapter 606 and the bottle cap 604 via the cap sealing O-ring 618 which assures that the fluid used for washing is used efficiently. That is, nearly all of the fluid expelled from the fluid inlet 620 may be run over the bottle threads 626, with minimal waste. Furthermore, the seal created between the sealable coating 608 and the rim 610 of the bottle 602 prevents the pressurized fluid from entering the bottle 602.

Proper alignment of the bottle 602 may depend on the design of the bottle 602. In at least one example, the bottle 602 may be properly aligned when the passages 612 are above the cap sealing O-ring 618 and are accessible to the upper interior region 622. A non-limiting example of specifications of a bottle adapter 606 used for properly aligning the bottle 602 are described. For instance, in at least one example, the distance between the top of the upper interior region 622 and the top of the bottle cap 604 (i.e., distance 628) may be approximately 0.2 inches. The distance between the top of the bottle cap 604 and the top of the cap sealing O-ring 618 (i.e., distance 630) may be approximately 0.2 inches. The thickness of cap sealing O-ring 618 may be approximately 0.23 inches (i.e., distance 632). The distance between the top of the bottle cap 604 and the bottom of bottle adapter 606 (i.e., distance 634) may be approximately 0.68 inches. As mentioned above, the aforementioned measurements are but one example for configuring the bottle adapter 606. However, additional and/or alternative measurements may be usable in the manufacture of the bottle adapter 606, so long as the cap sealing O-ring 618 forms a seal with the bottle cap 604 below the passages 612 and the passages 612 are accessible to the upper interior region 622 and the fluid inlet 620.

Figure 7:
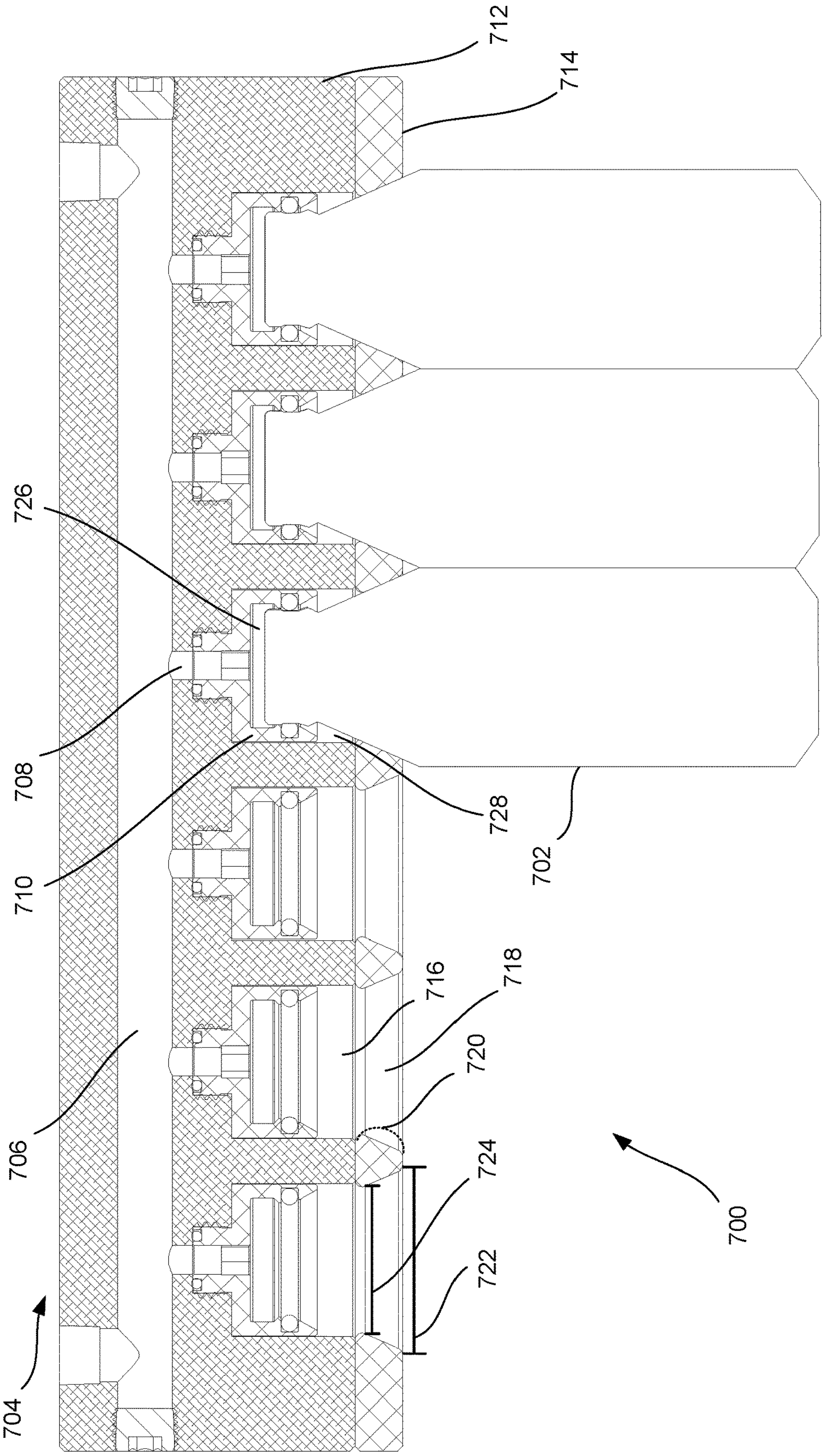
FIG. 7 illustrates a cross-sectional view of a manifold containing the apparatus of FIG. 6.

FIG. 7 illustrates a bottle rinsing system 700 with a bottle 702 engaging with a manifold 704. In at least one example, the bottle rinsing system 700 may correspond to the bottle rinsing system 403 described above with reference to FIG. 4. A manifold 704 includes a main line 706 connected to six fluid inlets, such as fluid inlet 708, that engage with one or more bottle adapters, such as bottle adapter 710 (similar to the bottle adapter 606, described above). The manifold 704 may be comprised of an upper manifold portion 712 that contains the one or more bottle adapters and a lower manifold portion 714, that enables proper alignment of the bottles (such as bottle 702) within the manifold 704. The upper manifold portion 712 may have one or more cavities, such as cavity 716, sized to house the one or more bottle adapters. The lower manifold portion 714 may have one or more openings, such as an opening 718. The one or more openings (e.g., opening 718) may be tapered such that the walls of the one or more openings form an angle, such as angle 720. The one or more openings of the lower manifold portion 714 may help guide the bottles (e.g., the bottle 702) into the one or more cavities (e.g., the cavity 716) of upper manifold portion 712, which contains the one or more bottle adapters (e.g., the bottle adapter 710). For instance, the bottle rinsing system 700 may include a conveyer belt (not shown) under a manifold, such as the manifold 704. When bottles arrive, they may not be aligned or spaced to properly couple with the bottle adapters inside of the manifold 704. The bottle rinsing system 700 may lower the manifold 704 onto the bottles, and as the manifold 704 is lowered onto the bottles, the angle 720 of the opening 718 in the lower manifold portion 714 aligns each bottle to properly couple with each bottle adapter located inside the one or more cavities of the upper manifold portion 712.

In at least one example, a bottle 702 may be properly coupled to a corresponding bottle adapter 710 when the opening in the lower manifold portion 714 aligns the bottle 702 within the bottle adapter 710 so that the angled opening of the lower manifold portion 714 is substantially flush with the upper portion of the bottle 702. In such an example, the angle of the opening may match the angle of the upper portion of the bottle 702 to enable the lower manifold portion 714 to be substantially flush with the upper portion of the bottle 702. As an example, each opening of the lower manifold portion 714 may have a lower opening length 722 and an upper opening length 724 such that the length 722 is greater than the length 724. As a result, the opening may be an angled opening that fits the conical-type shape of bottle 702. This angled opening may ensure that the bottle 702 is properly aligned to engage with the bottle adapter 710. Thus, when one or more bottles are placed below the manifold 704 by way of conveyer belt, for example, the bottle rinsing system 700 may the lower manifold 704 down onto the one or more bottles (e.g., bottle 702) and each bottle adapter (e.g., the bottle adapter 710) may be properly aligned to engage with each bottle. After the bottle rinsing system 700 lowers the manifold 704 to a predetermined height and the bottle adapter 710 is properly aligned with the bottle 702, the bottle rinsing system 700 may pass fluid into the main line 706 and into the fluid inlet 708 filling the upper interior region 726. The fluid may then pass through passages of the bottle (not shown in FIG. 7) and be expelled through lower the interior region 728, effectively cleaning the threads of bottle 702, as discussed above with reference to FIG. 6.

The manifold 704 (as well as any other manifold discussed herein) and the one or more bottle adapters may be comprised of a variety of different metals, plastics, and/or ceramics. Each part may be machined, cast, or formed by injection molding. The O-rings that are discussed may be comprised of rubber, silicone, or other materials suitable to form a seal. As discussed further at FIGS. 11A-11C, the O-rings may fit into recessed portions of the bottle adapter. Although O-rings are illustrated in the figures as the means by which the bottle adapter forms a seal with the manifold and the bottle cap, any sealing mechanism may be utilized to form such seals. For instance, the recessed portions of the bottle adapter may be filled with any type of sealant that can properly form a seal with the manifold 704 and the bottle cap.

FIG. 7 is an illustrative example of the manifold 704. FIG. 7 illustrates six bottle adapters; however, any number of bottle adapters may be utilized in the manifold 704. Furthermore, although the bottle adapter 710 is shown as a cylindrical shape, a bottle adapter may be in a variety of shapes. For instance, the bottle adapter 710 may have a tapered end such that there is a gap between the bottle adapter and the interior walls of the one or more cavities in the manifold 704.

Figure 8:
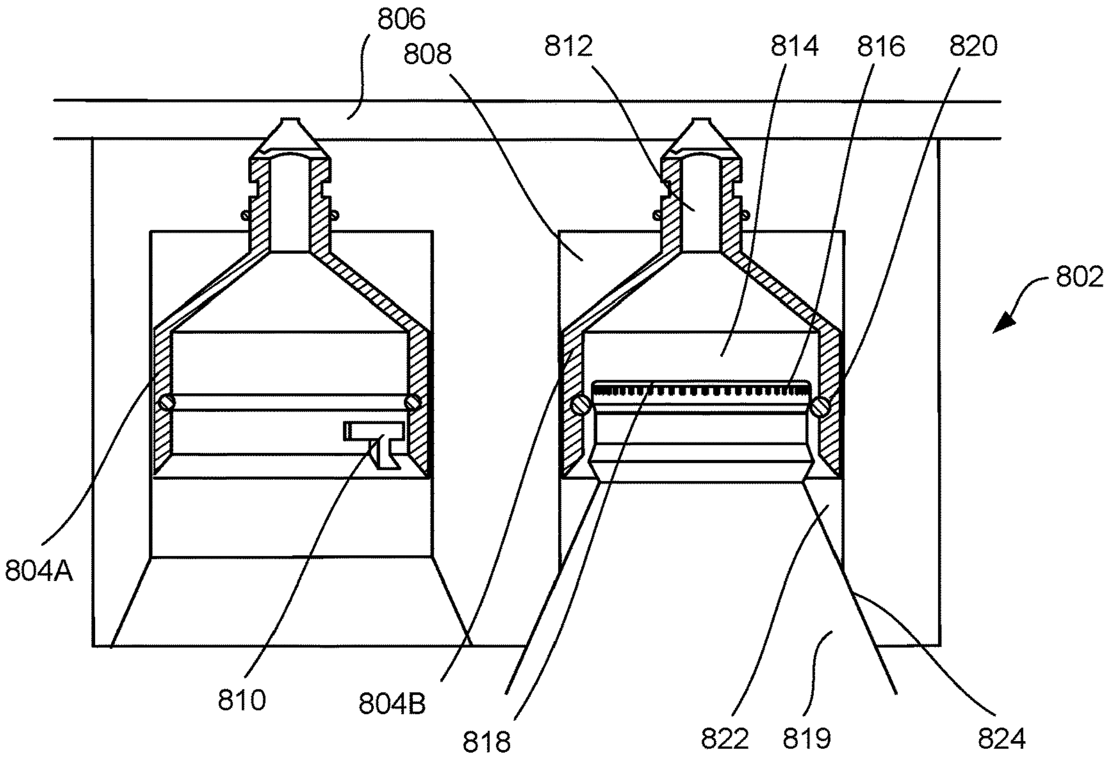
FIG. 8 illustrates additional details of the apparatus of FIG. 6.

FIG. 8 illustrates a manifold 802 and two bottle adapters, such as bottle adapter 804A, connected to a main line 806. The bottle adapter 804A has a cylindrical lower portion and a tapered upper portion, creating an area 808 between the bottle adapter 804A and the manifold 802. The tapered portion of the bottle adapter 804A may make insertion and removal of the bottle adapter 804A from the manifold 802 easier than a bottle adapter that fits flush with the manifold 802 because the formation of the area 808 provides less friction between the bottle adapter 804A and the manifold 802.

The bottle adapter 804A may be inserted into the manifold 802 and secured via a threaded upper portion of the bottle adapter 804A, such as a threaded upper portion 611 shown in FIG. 6, by using a tool (not shown) that is capable of coupling with a mechanism of bottle adapter 804A, such as a mechanism 810. The tool can be used to rotate the bottle adapter 804A so the threaded upper portion of the bottle adapter 804A couples with a threaded portion of the manifold 802. Similarly, the tool can be used to rotate the bottle adapter 804A so that the bottle adapter 804A becomes disconnected from the manifold 802. The mechanism 810 and means by which the bottle adapter 804A couples with the manifold 802 provide quick and easy removal and replacement of the plurality of bottle adapters that are coupled with the manifold 802. For instance, if a single bottle adapter is malfunctioning, that single bottle adapter can be replaced, as opposed to an entire the manifold 802 containing a plurality of bottle adapters having to be replaced.

Alternatively, the bottle adapter 804A may couple with the manifold 802 via means other than threads. For instance, a snap-fit mechanism may enable the bottle adapter 804A to couple to the manifold 802. Additionally, the manifold 802 may contain any number of bottled adapters 804N. The tapered end bottle adapter 804B works in a similar way to the bottle adapter 710 of FIG. 7. For instance, a bottle rinsing system, such as the bottle rinsing system 700, may pass fluid into the main line 806 and into the fluid inlet 812 filling the upper interior region 814. The fluid may then pass through the passages 816 of the cap 818 (which is attached to the bottle 819), which are above the cap sealing O-ring 820, and then be expelled through the lower interior region 822, effectively cleaning the threads of the bottle, as discussed above with reference to FIGS. 6 and 7. A line 824 represents both an upper portion of the bottle 819 as well as an angled wall of a lower portion of the manifold 802.

Figure 9:
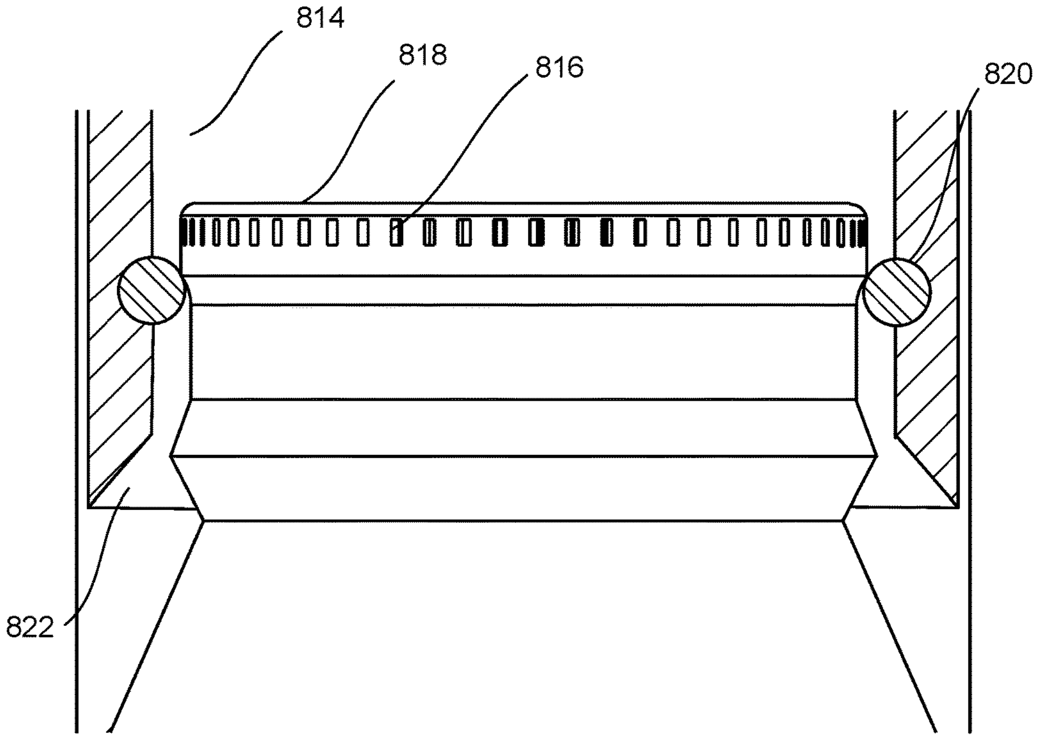
FIG. 9 illustrates a magnified version of FIG. 8.

FIG. 9 illustrates a magnified version of FIG. 8, including the upper interior region 814, the bottle cap 818, the passages 816, the cap sealing O-ring 820, and the lower interior region 822. As illustrated in FIG. 9, the cap sealing O-ring 820 may be positioned below the passages 816 to at least partially generate a seal between the bottle adapter (such as bottle adapter 804B) and the bottle cap 818 and to cause the fluid to enter via the passages 816 and be expelled via the lower interior region 822. Although FIG. 9 illustrates a gap between an interior wall of the bottle adapter and the bottle cap 818, other embodiments may include the interior wall of the bottle adapter being flush against the bottle cap 818.

Figure 10:
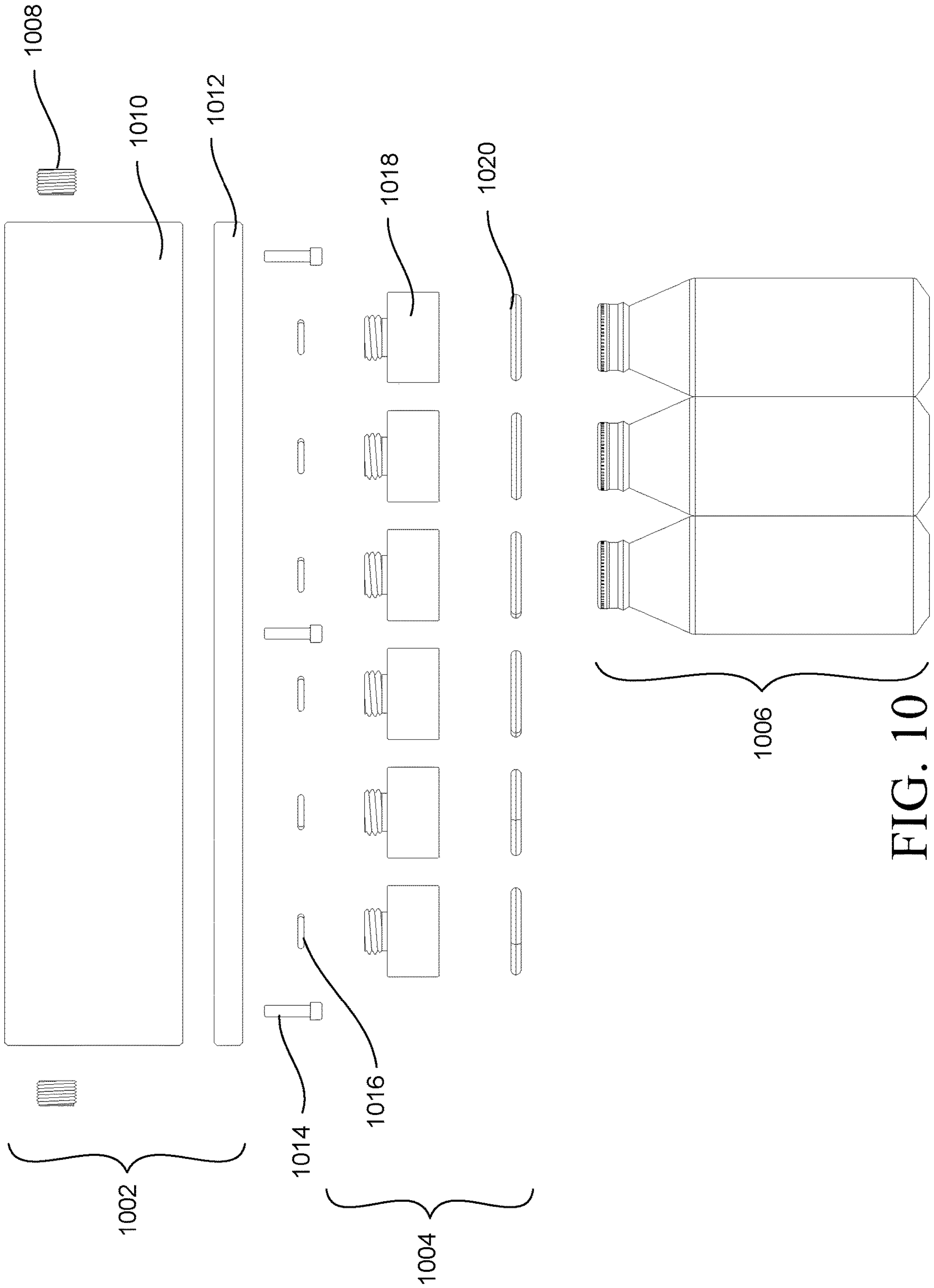
FIG. 10 illustrates a disassembled manifold and apparatus of FIG. 7.

FIG. 10 illustrates a disassembled manifold 1002, multiple disassembled bottle adapters 1004, and multiple bottles 1006. The manifold 1002 includes a threaded main line attachment piece 1008, an upper manifold portion 1010, a lower manifold portion 1012, and an attachment piece 1014. The attachment piece 1014 may be any number of securing mechanisms, such as a screw, nail, tack, or the like. Alternatively, the upper manifold portion 1010 and the lower manifold portion 1012 may be secured via adhesive. Alternatively, the upper manifold portion 1010 and the lower manifold portion 1012 may be machine-manufactured as a single piece. The multiple bottle adapters 1004 may include a face sealing O-ring 1016, a bottle adapter 1018, and a cap sealing O-ring 1020.

Figure 11A:
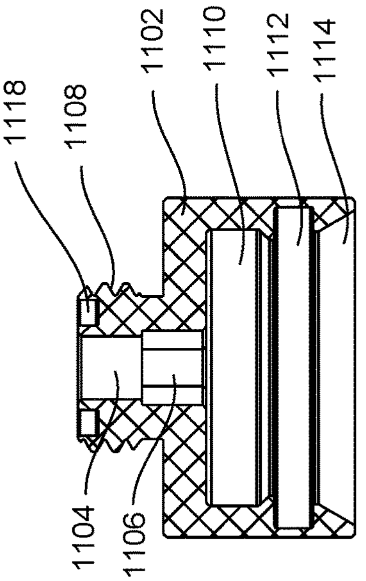
FIGS. 11A-11C illustrate additional details of the apparatus of FIG. 6, with FIG. 11A illustrating a cross-sectional view of the apparatus.
Figure 11B:
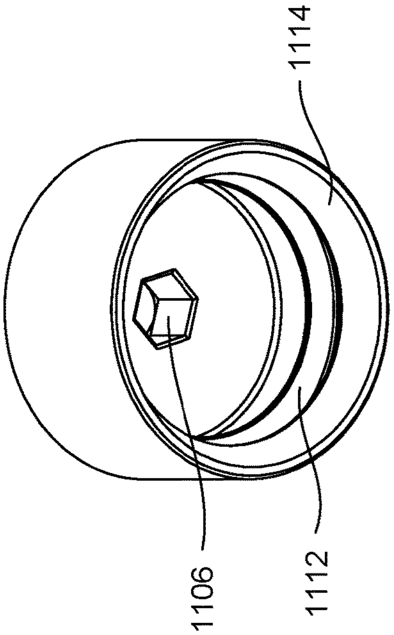
Figure 11C:
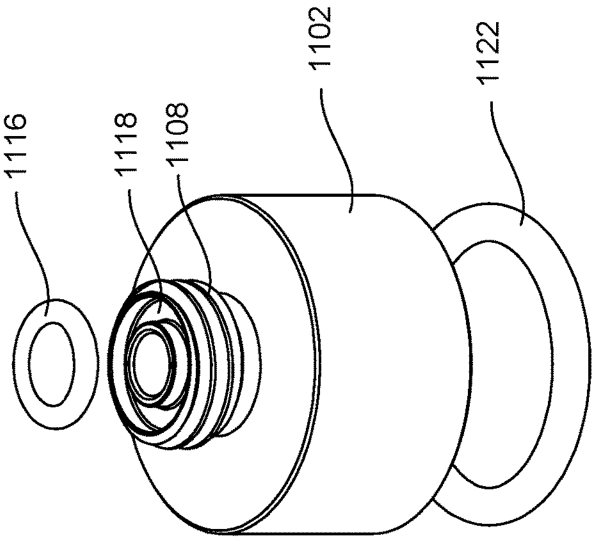

FIG. 11A-11C illustrate a cylindrical shaped bottle adapter 1102, similar to the bottle adapter 606, with a fluid inlet 1104, an installation mechanism 1106, a threaded upper portion 1108, an upper interior region 1110, a cap sealing O-ring portion 1112 for receiving a cap sealing O-ring 1122, a well portion 1118 sized to receive a face sealing O-ring 1116, and a lower interior region 1114. The upper interior region 1110, the cap sealing O-ring portion 1112, and the lower interior region 1114 may be referred to as a chamber or opening sized to receive a bottle cap. FIG. 11B illustrates an interior portion of bottle adapter 1102. FIG. 11C illustrates the bottle adapter 1100 disassembled with the face sealing O-ring 1116, the well portion 1118 sized to receive the face sealing O-ring 116 located in an interior of threaded the upper portion 1108, and the cap sealing O-ring 1122.

Figure 12:
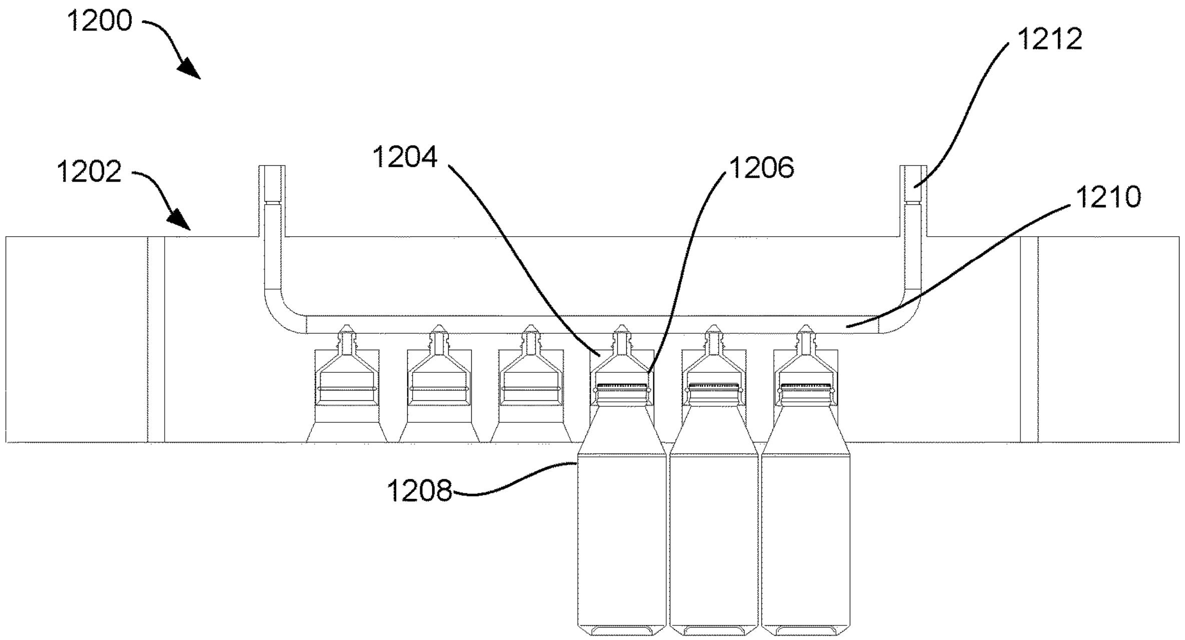
FIG. 12 illustrates a manifold containing an apparatus for rinsing beer and a tool used to insert/remove the apparatus.

FIG. 12 illustrates a bottle rinsing system 1200 comprising a manifold 1202 with a plurality of cavities, such as a cavity 1204, a plurality of bottle adapters, such as a bottle adapter 1206, and a plurality of bottles, such as a bottle 1208. Each of the bottle adapters may be coupled with the manifold 1202 via a main line 1210. The main line 1210 may receive fluid from a source 1212. Each bottle adapter may have an installation mechanism that is used to secure the bottle adapter 1206 to the manifold 1202. The installation mechanism may comprise any number of mechanisms to be utilized in inserting or removing the bottle adapter 1206 from the manifold 1202. For instance, the bottle adapter 1206 may include any installation mechanism that can be coupled with a wrench, nut driver, flex-head socket, T-handle, ratchet, or screw-driver.

Figure 13:
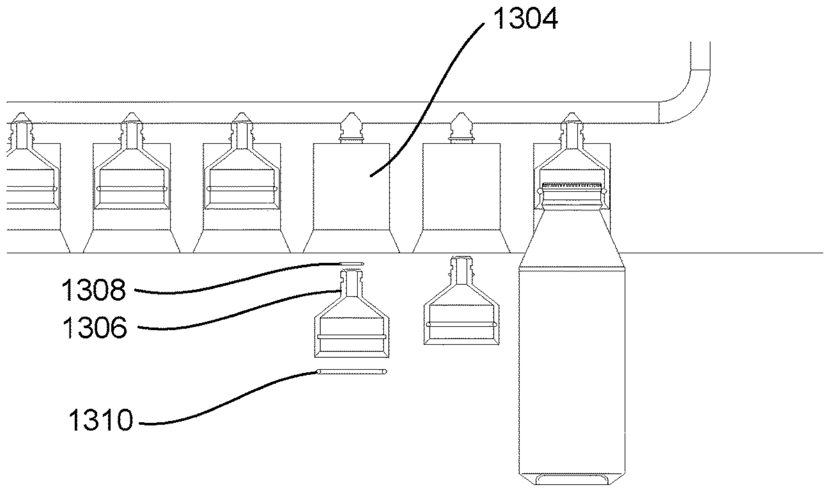
FIG. 13 illustrates a disassembled manifold and apparatus of FIG. 12 and a tool used to insert/remove the apparatus.

FIG. 13 illustrates a partially disassembled manifold, similar to the manifold 1202, with a plurality of cavities, such as a cavity 1304. As shown in FIG. 13, the cavity 1304 includes an upper portion sized to receive a tapered end a of bottle adapter 1306 and to form a seal with a face sealing O-ring 1308 of the bottle adapter 1306. Additionally, the bottle adapter 1306 may have an installation mechanism (not shown) as described in the embodiments discussed above, and a cap sealing O-ring 1310 used to form a seal with a bottle cap.

Figure 14:
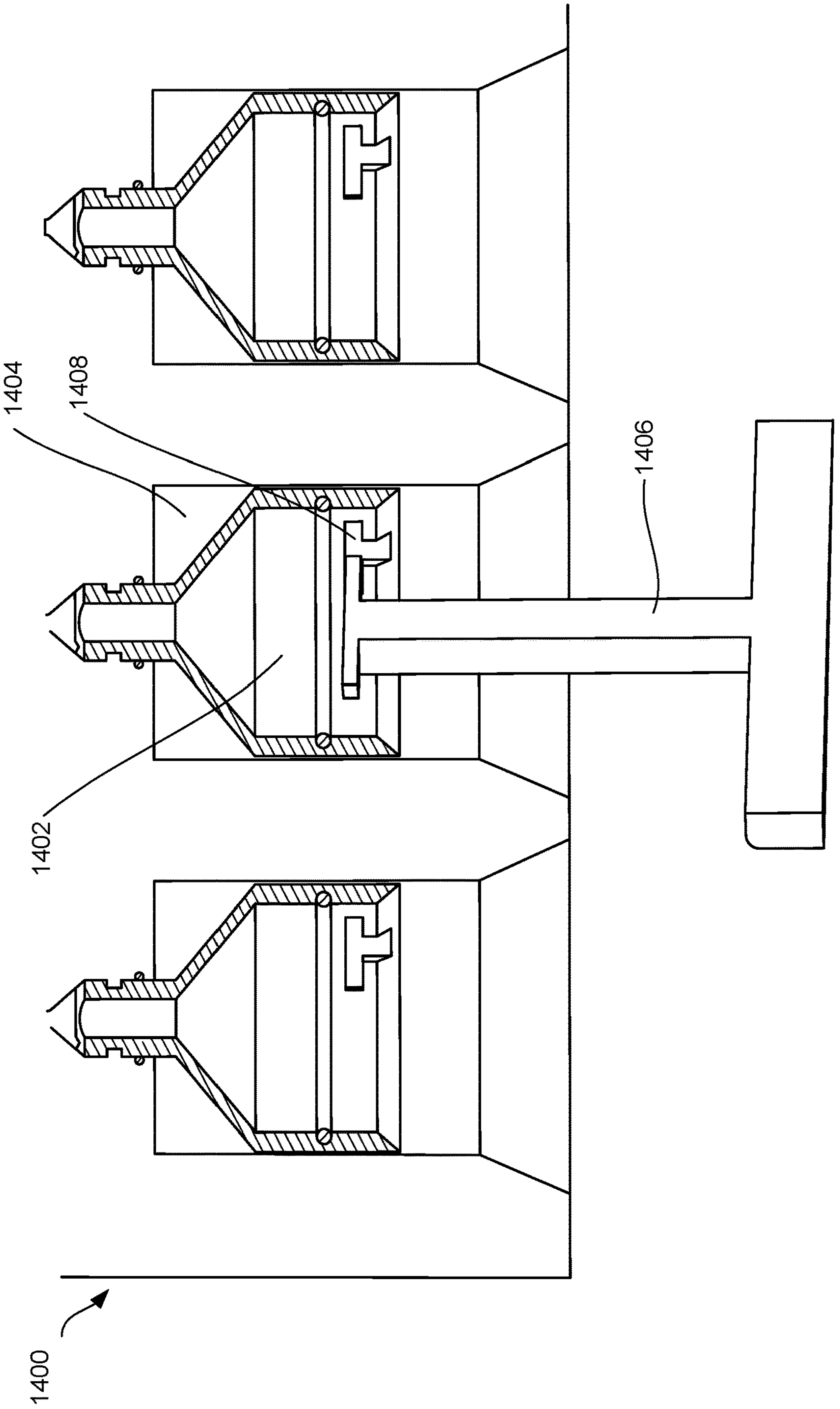
FIG. 14 illustrates a tool being used to insert/remove an apparatus from a manifold.

FIG. 14 illustrates a manifold 1400 with a bottle adapter 1402 being inserted/removed from a cavity 1404 of the manifold 1400 using a tool 1406 that couples with the installation mechanism 1408 of the bottle adapter 1402. Once the tool 1406 is coupled with the installation mechanism 1408, the tool 1406 may rotate the bottle adapter 1402 in one direction to tighten the coupling and may rotate in a different direction to loosen the coupling. As stated above, the installation mechanism 1408 may comprise any number of mechanisms to be utilized in inserting or removing the bottle adapter 1402 from the manifold 1400. For instance, the installation mechanism 1408 may comprise a hexagonal shaped head configured to install a bottle adapter such as bottle adapter 1102.

Figure 15:
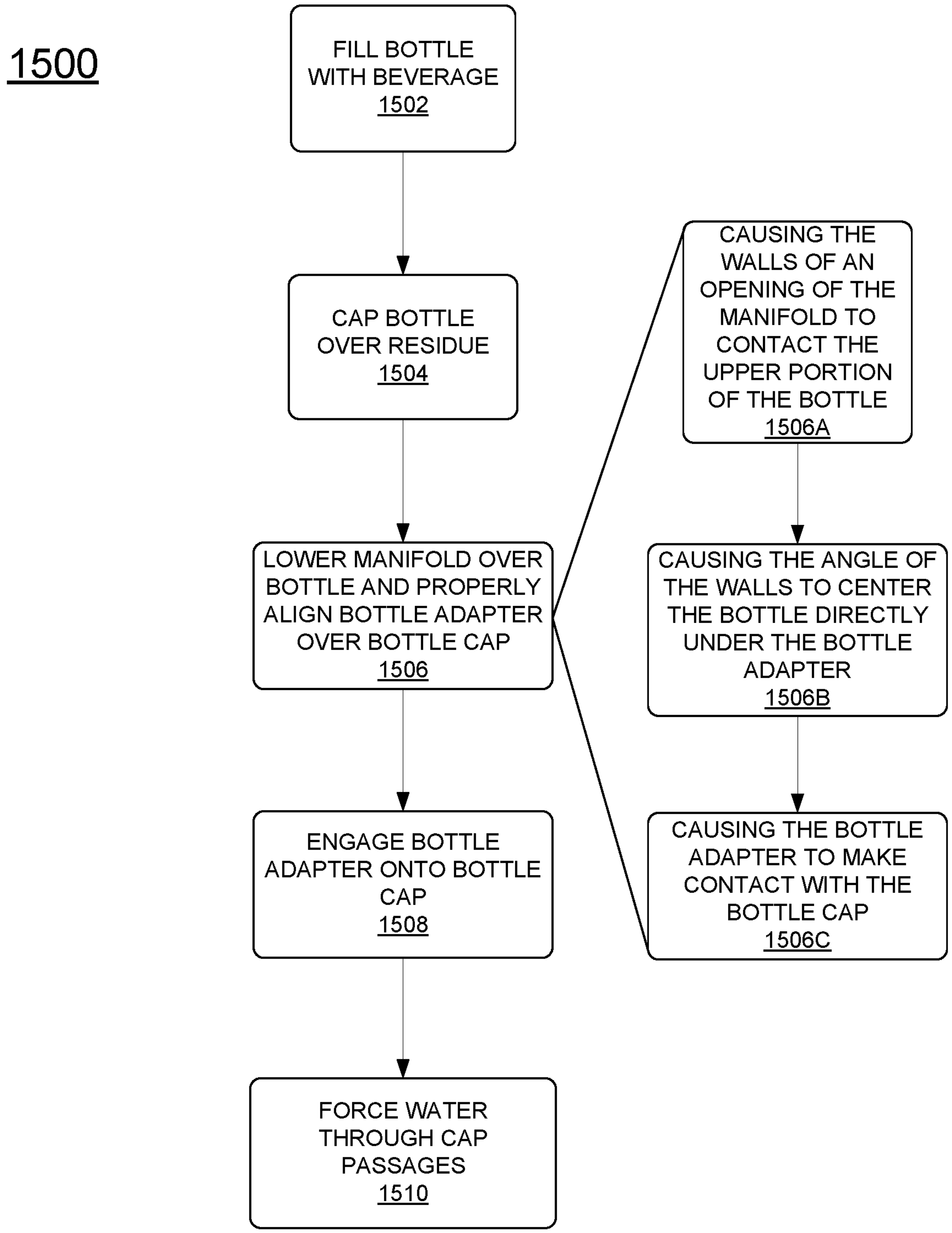
FIG. 15 is a flow diagram that illustrates a process of rinsing beverage residue out of the inner portion of the threads.

FIG. 15 illustrates a flow diagram 1500 that illustrates a further embodiment performed by a bottling system comprising a beverage dispensing system and a bottle rinsing system configured to rinse beverage residue out of the inner portion of the threads, e.g., the boundary between the bottle threads and the bottle cap threads.

At block 1502, similar to blocks 402 and 502 of FIGS. 4 and 5, respectively, a beverage dispensing system, such as the beverage dispensing system 401, fills a bottle, such as the bottle 819, with a beverage such as, for example, beer. In some implementations, the beverage may be precarbonated using various carbonation methods such as force carbonating the beverage with pressurized carbon dioxide. The beverage dispensing system 401 may inject the beverage into the bottle 819 via a filler tube, such as the filler tube 406. Filling the bottle at block 1502 may result in at least some of the beverage overflowing from the bottle 819 as beer residue. For example, the bottle 819 may be intentionally overfilled or caused to foam over with beverage residue to enable the "capping on foam" of the beverage to prevent contamination. In another embodiment, after the bottle 819 is filled with the beverage, the beverage dispensing system 401 may agitate the beverage in order to cause the beverage to foam. For instance, the beverage may be agitated by quickly spraying the beverage with hot or cold water, adding nitrogen to the beverage, or using ultrasound to vibrate the bottle 819 and beverage.

At block 1504, similar to block 408 and 504 of FIGS. 4 and 5, respectively, a bottling system, such as the bottling system 400, may place a bottle cap, such as the bottle cap 818 over the bottle 819 directly over the beverage residue such that the inner portion of the bottle cap 818 becomes at least partially into contact with the beverage residue. For example, the bottling system 400 may press the bottle cap 818 over the residue and onto the rim of the bottle 819 to create a seal between the rim and the sealable coating of the bottle cap 818. A pilfer ring may secure the bottle cap to the bottle.

At block 1506, a bottle rinsing system, such as bottle rinsing system 700, may properly align a bottle adapter, such as the bottle adapter 804A, with the bottle cap 818, by lowering a manifold, such as the manifold 802, over the bottle 819. For instance, at block 1509A, the manifold 802 may have an opening, such as the opening 718, angled such that the walls of the opening lay substantially flush with an upper portion of the bottle when the walls make contact to the upper portion of the bottle. At block 1506B, the angled walls effectively vertically center the bottle 819 directly under the bottle adapter 804A. Thus, at block 1506C, when the bottle rinsing system 700 fully lowers the manifold 802 onto the bottle 819, the adapter 804A is properly aligned so that a cap sealing O-ring, such as cap sealing O-ring 820, is located below passages of the bottle cap 818, such as the passages 816. This may be done manually or automatically. For instance, multiple bottles may be placed under a manifold, the manifold may be lowered onto the bottles, the angle of the opening of each cavity within the manifold aligning with the angled upper portion of each bottle to properly couple the bottle cap with each bottle adapter, effectively centering each bottle directly below each bottle adapter.

At block 1508, the bottle rinsing system 700 may fully lower the manifold 802 and the bottle adapter 804A onto the bottle cap 818, causing cap sealing O-ring 820, to be located below passages 816 of the bottle cap 818.

At block 1510, the bottle rinsing system 700 may force pressurized fluid, such as water, through the bottle adapter 804A from a main line, such as the main line 806, of the manifold 802 and be configured to force the fluid from an upper interior region, such as the upper interior region 814, through the passages 816 in the bottle cap 818 while the bottle cap sealing O-ring 820 is conforming to the shape of the bottle cap 818 and is located below the passages 816 to at least partially generate a seal between the bottle adapter 804A and the bottle cap 818. At block 1510, the bottle rinsing system 700 forces pressurized fluid through the passages 816 of the bottle cap 818 to rinse beverage residue from the threads. In further embodiments, the bottle rinsing system 700 may force other fluids through the passages of the bottle cap via the bottle adapter. For example, pressurized air may be forced through the passages to remove the water used at block 1510. Once the washing is complete, the bottle rinsing system may collect the fluid and reuse the fluid for subsequent washings.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims. Specifically, the embodiments and descriptions described supra are for illustrative purposes only and are not intended to limit the scope of the apparatuses, systems, and/or methods described and claimed herein. Insofar as the description above and accompanying drawings disclose any additional subject matter that is not within the scope of claims set forth below, the inventions are not dedicated to the public and the right to file one or more applications to claim such additional inventions is reserved.

What is claimed is:

1. A bottle cap rinsing system comprising:
- a manifold having a plurality of cavities coupled with a fluid line; and
- a plurality of bottle adapters being sized to fit inside the plurality of cavities, at least one bottle adapter of the plurality of bottle adapters including:
  - an upper portion and a lower portion, the upper portion comprising:
    - a mechanism for coupling to the manifold;
    - a fluid inlet for receiving fluid from the manifold; and
    - a recess sized to receive a first sealing mechanism for forming a first seal with the manifold; and
  - the lower portion comprising:
    - a chamber sized to receive a bottle cap; and
    - a recess defined in the chamber and sized to receive a second sealing mechanism for forming a second seal with the bottle cap.

2. The bottle cap rinsing system of claim 1, wherein the lower portion has a cylindrical shape and the upper portion tapers towards the fluid inlet, forming a substantially conical shape.

3. The bottle cap rinsing system of claim 1, wherein the lower portion has a cylindrical shape and the upper portion has a cylindrical shape and the lower portion has a first diameter that is greater than a second diameter of the upper portion.

4. The bottle cap rinsing system of claim 1, wherein the at least one bottle adapter further comprises an upper region located between the first sealing mechanism and the second sealing mechanism and being sized to contain fluid from the fluid inlet.

5. The bottle cap rinsing system of claim 1, wherein the at least one bottle adapter of the plurality of bottle adapters includes an O-ring configured to provide a seal with the manifold in response to the at least one bottle adapter being coupled to the manifold inside a corresponding cavity.

6. The bottle cap rinsing system of claim 1, wherein the at least one bottle adapter of the plurality of bottle adapters includes an O-ring configured to provide a seal with a bottle cap in response to the bottle cap being coupled to the at least one bottle adapter.

7. The bottle cap rinsing system of claim 6, wherein the at least one bottle adapter further includes a receiving tube, and wherein the O-ring is positioned within the receiving tube to provide the seal with the bottle cap, and to isolate an upper portion of the receiving tube from a lower portion of the receiving tube.

8. The bottle cap rinsing system of claim 1, wherein the fluid inlet receives the fluid from the fluid line.

9. The bottle cap rinsing system of claim 1, wherein the at least one bottle adapter of the plurality of bottle adapters includes a threaded upper portion for attaching to the manifold and the fluid inlet includes a hex socket usable to couple the at least one bottle adapter of the plurality of bottle adapters to the manifold.

10. The bottle cap rinsing system of claim 1, wherein the at least one bottle adapter of the plurality of bottle adapters comprises a first bottle adapter, the plurality of bottle adapters including a second bottle adapter that is conical shaped.

11. A bottle adapter comprising:

an upper portion and a lower portion, the upper portion comprising:

a mechanism for coupling to a manifold;

a fluid inlet for receiving fluid from the manifold; and a recess sized to receive a first sealing mechanism for forming a first seal with the manifold; and the lower portion comprising:

a chamber sized to receive a bottle cap; and a recess defined in the chamber and sized to receive a second sealing mechanism for forming a second seal with the bottle cap.

12. The bottle adapter of claim 11, wherein the lower portion has a cylindrical shape and the upper portion tapers towards the fluid inlet, forming a substantially conical shape.

13. The bottle adapter of claim 11, wherein the lower portion has a cylindrical shape and the upper portion has a cylindrical shape and the lower portion has a first diameter that is greater than a second diameter of the upper portion.

14. The bottle adapter of claim 11, wherein the bottle adapter further comprises an upper region located between the first sealing mechanism and the second sealing mechanism and being sized to contain fluid from the fluid inlet.

15. The bottle adapter of claim 11, wherein the bottle adapter is removable from the manifold via by an installation mechanism.

16. The bottle adapter of claim 11, wherein the bottle adapter has a cylindrical shape and has a threaded upper portion for attaching to the manifold, and the fluid inlet includes a hex socket.

17. The bottle adapter of claim 11, wherein the bottle adapter includes an O-ring configured to provide the first seal with the manifold in response to the bottle adapter being coupled to the manifold inside a corresponding cavity.

18. The bottle adapter of claim 11, wherein the bottle adapter includes an O-ring configured to provide the second seal with the bottle cap in response to the bottle cap being coupled to the bottle adapter.

19. The bottle adapter of claim 18, wherein the bottle adapter further includes a receiving tube, and wherein the O-ring is positioned within the receiving tube to provide the second seal with the bottle cap, and to isolate an upper portion of the receiving tube from a lower portion of the receiving tube.

20. The bottle adapter of claim 11, wherein the bottle adapter comprises a first bottle adapter of a plurality of bottle adapters, the plurality of bottle adapters including a second bottle adapter that is conical shaped.

* * * * *